(12) United States Patent
Nagashima et al.

(10) Patent No.: US 11,541,941 B2
(45) Date of Patent: Jan. 3, 2023

(54) FRONT VEHICLE-BODY STRUCTURE FOR VEHICLE

(71) Applicant: MAZDA MOTOR CORPORATION, Hiroshima (JP)

(72) Inventors: Yuki Nagashima, Aki-gun (JP); Masaru Chikita, Aki-gun (JP); Yasushi Ishikawa, Aki-gun (JP); Ken Fujimoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 106 days.

(21) Appl. No.: 17/206,709

(22) Filed: Mar. 19, 2021

(65) Prior Publication Data

US 2021/0323611 A1 Oct. 21, 2021

(30) Foreign Application Priority Data

Apr. 20, 2020 (JP) .............................. JP2020-074839

(51) Int. Cl.
| | | |
|---|---|---|
| *B60J 7/00* | (2006.01) | |
| *B62D 25/14* | (2006.01) | |
| *B60K 26/02* | (2006.01) | |
| *B62D 21/15* | (2006.01) | |
| *B62D 25/20* | (2006.01) | |

(52) U.S. Cl.
CPC .............. *B62D 25/14* (2013.01); *B60K 26/02* (2013.01); *B62D 21/152* (2013.01); *B62D 25/2018* (2013.01)

(58) Field of Classification Search
CPC ..... H04W 24/10; H04W 72/04; H04W 36/08; H04W 72/042; A61P 35/00; B60R 9/045; B60R 9/12; B60P 3/08; G07B 15/063; B65G 69/003
See application file for complete search history.

(56) References Cited

U.S. PATENT DOCUMENTS

| | | | | |
|---|---|---|---|---|
| 5,188,001 | A * | 2/1993 | Sukeshita ............... | B60K 26/02 |
| 10,747,256 | B1 * | 8/2020 | Kim ......................... | G05G 1/46 |
| 2003/0066699 | A1 * | 4/2003 | Kawakami ............. | B62D 25/14 |
| | | | | 180/90 |
| 2007/0176456 | A1 * | 8/2007 | Ohtsubo ................ | B60N 2/074 |
| | | | | 296/75 |

(Continued)

FOREIGN PATENT DOCUMENTS

JP 2013014171 A 1/2013

*Primary Examiner* — Kiran B Patel
(74) *Attorney, Agent, or Firm* — Studebaker & Brackett PC

(57) ABSTRACT

A front vehicle-body structure is provided that is lightweight and reduces an impact load transmitted to lower limbs of an occupant. Embodiments include a transmission disposed in a vehicle front portion, a dash lower panel dividing an inside from an outside of a vehicle cabin in a vehicle rear of the transmission, and an organ type accelerator pedal disposed on a vehicle-width-direction inner side of the dash lower panel opposed to the transmission. The dash lower panel includes a panel rear portion in which the accelerator pedal is arranged, a panel front portion extending from the panel rear portion to a vehicle front upper side, and a fragile portion extending in a vehicle width direction along a boundary between the panel rear portion and the panel front portion, which is fragile compared to the panel rear portion and the panel front portion.

20 Claims, 11 Drawing Sheets

(56) References Cited

U.S. PATENT DOCUMENTS

2017/0240044 A1* 8/2017 Tabata .................... G05G 1/44
2021/0323611 A1* 10/2021 Nagashima ........ B62D 25/2018
2022/0176815 A1* 6/2022 Kadoi .................... B60K 26/02

* cited by examiner

FIG. 10

FRONT VEHICLE-BODY STRUCTURE FOR VEHICLE

TECHNICAL FIELD

This disclosure relates to a front vehicle-body structure for a vehicle, in which an organ type accelerator pedal or a foot rest is disposed on a vehicle-width-direction inner side of a dash panel opposed to a power train, for example.

BACKGROUND

In a vehicle such as an automobile, when a vehicle front portion collides with a collision object, an impact load acts on an occupant seated on a front seat such that the occupant is thrown out to a vehicle front. In this case, when the occupant braces both of their legs against movement to the vehicle front, as a force bending the ankles of the occupant causes the toes to approach the shins, the impact load tends to act on the lower limbs of the occupant. Thus, when the vehicle front portion collides with the collision object, the occupant might injure their lower limbs due to the impact load.

Accordingly, various techniques have been suggested that reduce damage to the lower limbs of the occupant when the vehicle front portion collides with the collision object. For example, Japanese Patent Laid-Open No. 2013-14171 discloses a front vehicle-body structure in which a dash panel on a passenger seat side includes a mechanism composed of a footboard on which a foot of an occupant is placed, a support member rotatably supporting a back end of the footboard, and a load absorption member absorbing a load applied to the footboard.

In Japanese Patent Laid-Open No. 2013-14171, while a load caused by bracing of both of the legs by the occupant and a load moving the occupant to a vehicle front when a vehicle collides with a collision object are absorbed by the load absorption member, an impact load acting on the lower limbs of the occupant is absorbed by rotational movement of the footboard to the vehicle front. Accordingly, in Japanese Patent Laid-Open No. 2013-14171, a force causing the toes to approach the shins is inhibited from acting on the lower limbs of the occupant, and damage to the lower limbs of the occupant is thereby reduced.

When the vehicle front portion collides with the collision object, a power train disposed in the vehicle front portion moves backward and contacts with a dash panel, and the impact load may thereby be applied to the dash panel on a passenger seat side. In this case, because a mechanism as taught by Japanese Patent Laid-Open No. 2013-14171 can absorb the impact load applied to the dash panel of the passenger seat, even if the dash panel is displaced to vehicle rear, an impact load transmitted to the lower limbs of the occupant can be lessened. However, for example, in a case of a driver seat of a left-hand drive vehicle, because an accelerator pedal is arranged on the right side of the dash panel opposed to the power train, a mechanism as in Japanese Patent Laid-Open No. 2013-14171 cannot be provided to the dash panel.

Furthermore, an organ type accelerator pedal has a problem that because the accelerator pedal and the dash panel are integrally displaced to the vehicle rear when the dash panel is displaced to the vehicle rear due to the impact load, the force bending the ankles of the occupant so as to cause the toes to approach the shins tends to be transmitted to the lower limbs of the occupant.

Thus, in the dash panel in which the organ type accelerator pedal is arranged, in order to lessen the displacement to the vehicle rear due to the impact load, for example, it is possible to make a board thickness thick. However, in this case, although the impact load can be inhibited from acting on the lower limbs of the occupant as the force bending the ankles of the occupant causes the toes to approach the shins, weight and cost significantly increase.

SUMMARY

In consideration of the above-described problem, the present disclosure provides a front vehicle-body structure for a vehicle that can inhibit a weight increase and reduce an impact load transmitted to lower limbs of an occupant.

This disclosure provides a front vehicle-body structure for a vehicle, the front vehicle-body structure including: a power train disposed in a vehicle front portion; a dash panel dividing an inside from an outside of a vehicle cabin in vehicle rear of the power train; and an organ type accelerator pedal or a foot rest disposed on a vehicle-width-direction inner side of the dash panel opposed to the power train, characterized in that the dash panel includes: a panel rear portion in which the accelerator pedal or the foot rest is arranged; a panel front portion extending from the panel rear portion to a vehicle front upper side; and a fragile portion extending in a vehicle width direction along a boundary between the panel rear portion and the panel front portion and being fragile compared to the panel rear portion and the panel front portion.

The above fragile portion denotes a bead protruding in a thickness direction of the dash panel, a portion that is made thin compared to the panel rear portion and the panel front portion, or the like. According to this disclosure, the front vehicle-body structure for a vehicle can inhibit a weight increase and reduce an impact load transmitted to the lower limbs of an occupant.

Specifically, because the panel front portion of the dash panel is provided to extend from the panel rear portion to the vehicle front upper side, the front vehicle-body structure for a vehicle can cause the power train moving backward due to collision with a collision object to contact with the panel front portion earlier than the panel rear portion.

In this case, because the fragile portion is provided in the boundary between the panel rear portion and the panel front portion, the front vehicle-body structure for a vehicle can bend the dash panel at the fragile portion such that the panel front portion rotationally moves to the vehicle rear around the fragile portion as a pivot.

Accordingly, the front vehicle-body structure for a vehicle can absorb an impact load applied to the dash panel and inhibit the accelerator pedal or the foot rest from being displaced to the vehicle rear. Thus, the front vehicle-body structure for a vehicle can inhibit the impact load from acting on the lower limbs of the occupant as a force causing the toes to approach the shins.

Furthermore, because it is sufficient that only the fragile portion is provided in the dash panel, the front vehicle-body structure for a vehicle can inhibit a weight increase compared to a case where a board thickness of the dash panel is made thick. Consequently, the front vehicle-body structure for a vehicle can inhibit a weight increase and reduce the impact load transmitted to the lower limbs of the occupant.

As an aspect of this disclosure, the fragile portion may be composed of a lateral bead protruding to a vehicle lower side and extending in the vehicle width direction. With this configuration, in the front vehicle-body structure for a vehicle, the fragile portion can be formed with a comparatively simple configuration. Thus, the front vehicle-body structure for a vehicle can certainly inhibit a weight increase.

Further, as an aspect of this disclosure, the panel front portion of the dash panel may include a front portion bead being adjacent to the lateral bead and extending in a vehicle front-rear direction. With this configuration, because the rigidity of the panel front portion can be improved in the front vehicle-body structure for a vehicle, a rigidity difference between the fragile portion and the panel front portion can be made large.

Thus, when the impact load is applied to the dash panel via the power train, the front vehicle-body structure for a vehicle can certainly bend the dash panel at the fragile portion. Consequently, the front vehicle-body structure for a vehicle can certainly reduce the impact load transmitted to the lower limbs of the occupant by the front portion bead provided in the panel front portion.

Further, as an aspect of this disclosure, the panel rear portion of the dash panel may include a rear portion bead being adjacent to the lateral bead and extending in a vehicle front-rear direction. With this configuration, because the rigidity of the panel rear portion can be improved in the front vehicle-body structure for a vehicle, a rigidity difference between the fragile portion and the panel rear portion can be made large.

Thus, when the impact load is applied to the dash panel via the power train, the front vehicle-body structure for a vehicle can more certainly bend the dash panel at the fragile portion. Furthermore, because the rigidity of the panel rear portion is improved by the rear portion bead, the front vehicle-body structure for a vehicle can inhibit the panel rear portion from being deformed due to the impact load applied to the dash panel.

The front vehicle-body structure for a vehicle can inhibit the accelerator pedal or the foot rest from being displaced to the vehicle rear together with the panel rear portion. Consequently, the front vehicle-body structure for a vehicle can more certainly reduce the impact load transmitted to the lower limbs of the occupant by the rear portion bead provided in the panel rear portion.

Further, as an aspect of this disclosure, the dash panel may include a reinforcement member having a front end positioned close to the fragile portion and covering the panel rear portion. With this configuration, because the rigidity of the panel rear portion can be improved more in the front vehicle-body structure, the rigidity difference between the fragile portion and the panel rear portion can further be made large.

When the impact load is applied to the dash panel via the power train, the front vehicle-body structure can further certainly bend the dash panel at the fragile portion. Furthermore, because the rigidity of the panel rear portion is improved by the reinforcement member, the front vehicle-body structure can further inhibit the panel rear portion from being deformed due to the impact load applied to the dash panel.

Thus, the front vehicle-body structure for a vehicle can further inhibit the accelerator pedal or the foot rest from being displaced to the vehicle rear together with the panel rear portion. Consequently, since the reinforcement member is provided that covers the panel rear portion, the front vehicle-body structure for a vehicle can further certainly reduce the impact load transmitted to the lower limbs of the occupant.

Further, as an aspect of this disclosure, the reinforcement member may include a reinforcement bead protruding to a vehicle upper side and forming a closed cross-section with the panel rear portion. With this configuration, because the rigidity of the panel rear portion can further be improved in the front vehicle-body structure for a vehicle, the rigidity difference between the fragile portion and the panel rear portion can still further be made large.

Thus, when the impact load is applied to the dash panel via the power train, the front vehicle-body structure for a vehicle can more certainly bend the dash panel at the fragile portion. Furthermore, because the rigidity of the panel rear portion is improved by the reinforcement bead of the reinforcement member, the front vehicle-body structure for a vehicle can certainly inhibit the panel rear portion from being deformed due to the impact load applied to the dash panel.

The front vehicle-body structure for a vehicle can certainly inhibit the accelerator pedal or the foot rest from being displaced to the vehicle rear together with the panel rear portion. Consequently, since the reinforcement bead is provided in the reinforcement member, the front vehicle-body structure for a vehicle can still further reduce the impact load transmitted to the lower limbs of the occupant.

Further, as an aspect of this disclosure, the panel front portion of the dash panel may include: an insertion hole through which a vehicle component is inserted; and an opening reinforcement member disposed along an opening edge of the insertion hole. With this configuration, in the front vehicle-body structure for a vehicle, the opening reinforcement member is provided, a periphery of the insertion hole can thereby be inhibited from being fragile, and the rigidity of the panel front portion can be inhibited from being lowered due to the insertion hole.

Thus, even in a case where the insertion hole is provided, the front vehicle-body structure for a vehicle can secure the rigidity difference between the fragile portion and the panel front portion. Accordingly, when the impact load is applied to the dash panel via the power train, the front vehicle-body structure for a vehicle can certainly bend the dash panel at the fragile portion. Consequently, even in a case where the insertion hole is provided in the panel front portion, the front vehicle-body structure for a vehicle can reduce the impact load transmitted to the lower limbs of the occupant.

The present disclosure can provide a front vehicle-body structure for a vehicle that can inhibit a weight increase and reduce an impact load transmitted to lower limbs of an occupant.

BRIEF DESCRIPTION OF THE DRAWINGS

FIG. 10 is a cross-sectional view, along arrows A-A, illustrating a state where a transmission contacts with the dash lower panel.

DETAILED DESCRIPTION

One embodiment of this disclosure will hereinafter be described with reference to drawings. A vehicle of this embodiment is a left-hand drive vehicle in which an organ type accelerator pedal is disposed on a vehicle-width-direction inner side of a dash panel opposed to a transmission. A front vehicle-body structure of such a vehicle will be described with reference to FIG. 1 to FIG. 9.

Figure 1:
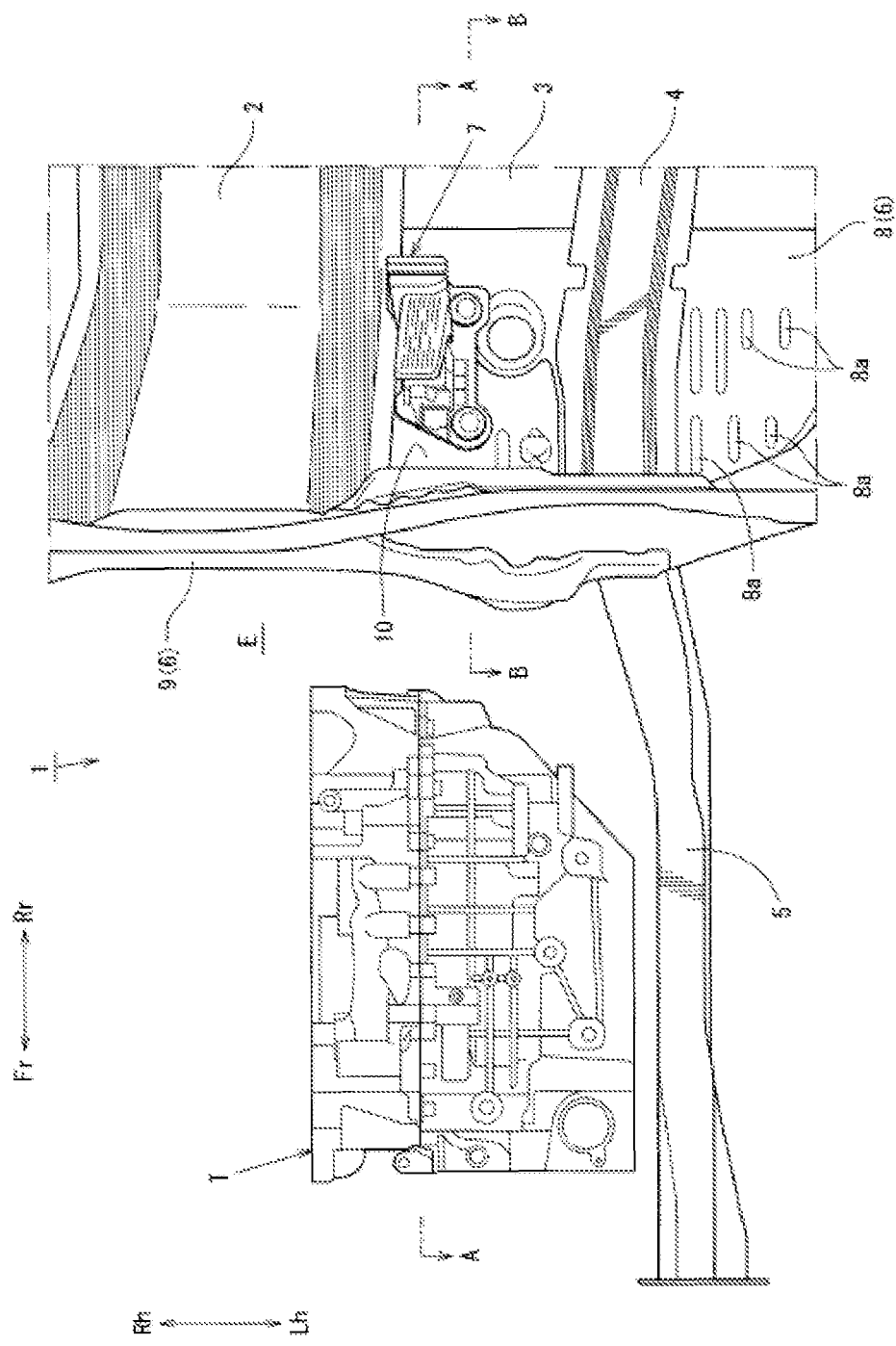
FIG. 1 is a plan view illustrating an external appearance of a vehicle left side of a vehicle front portion.
Figure 2:
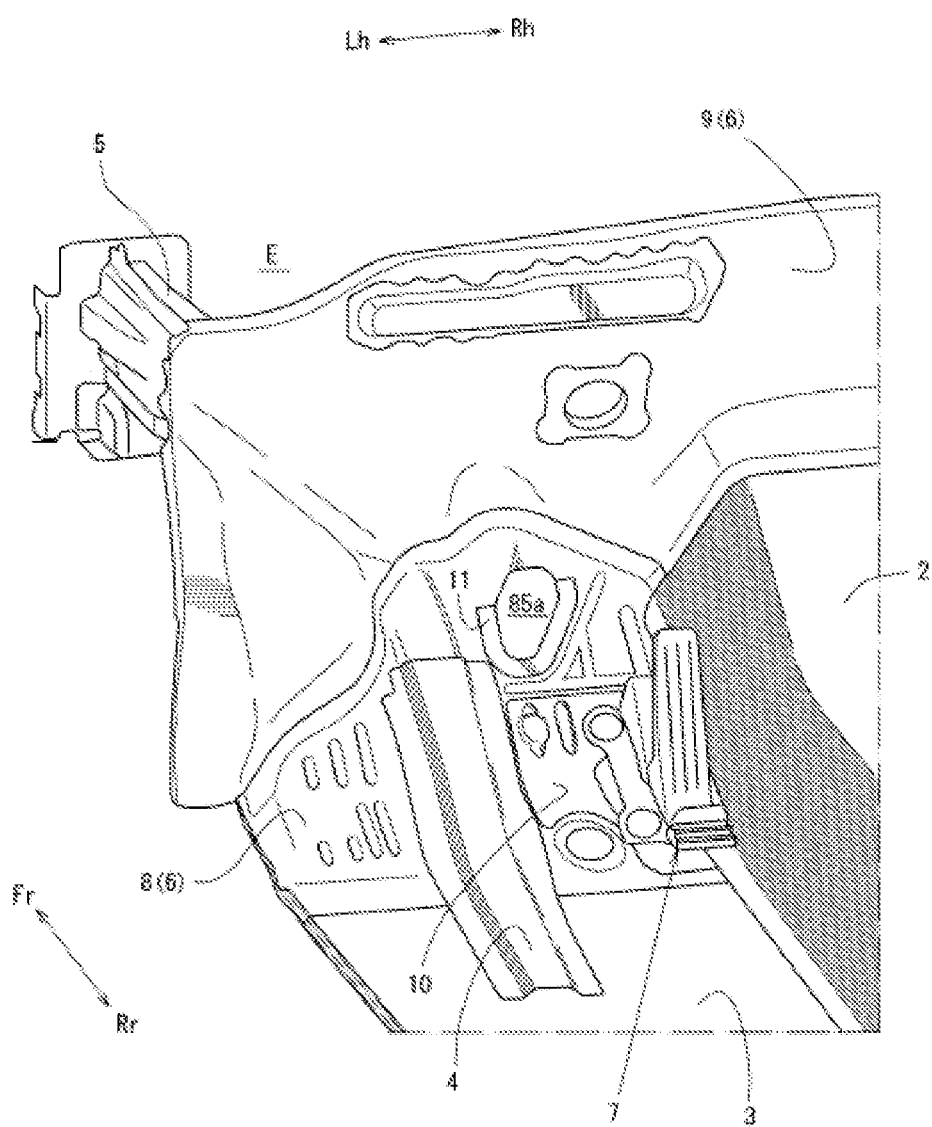
FIG. 2 is an external perspective view illustrating an external appearance of a dash panel as seen from an inside of a vehicle cabin.
Figure 3:
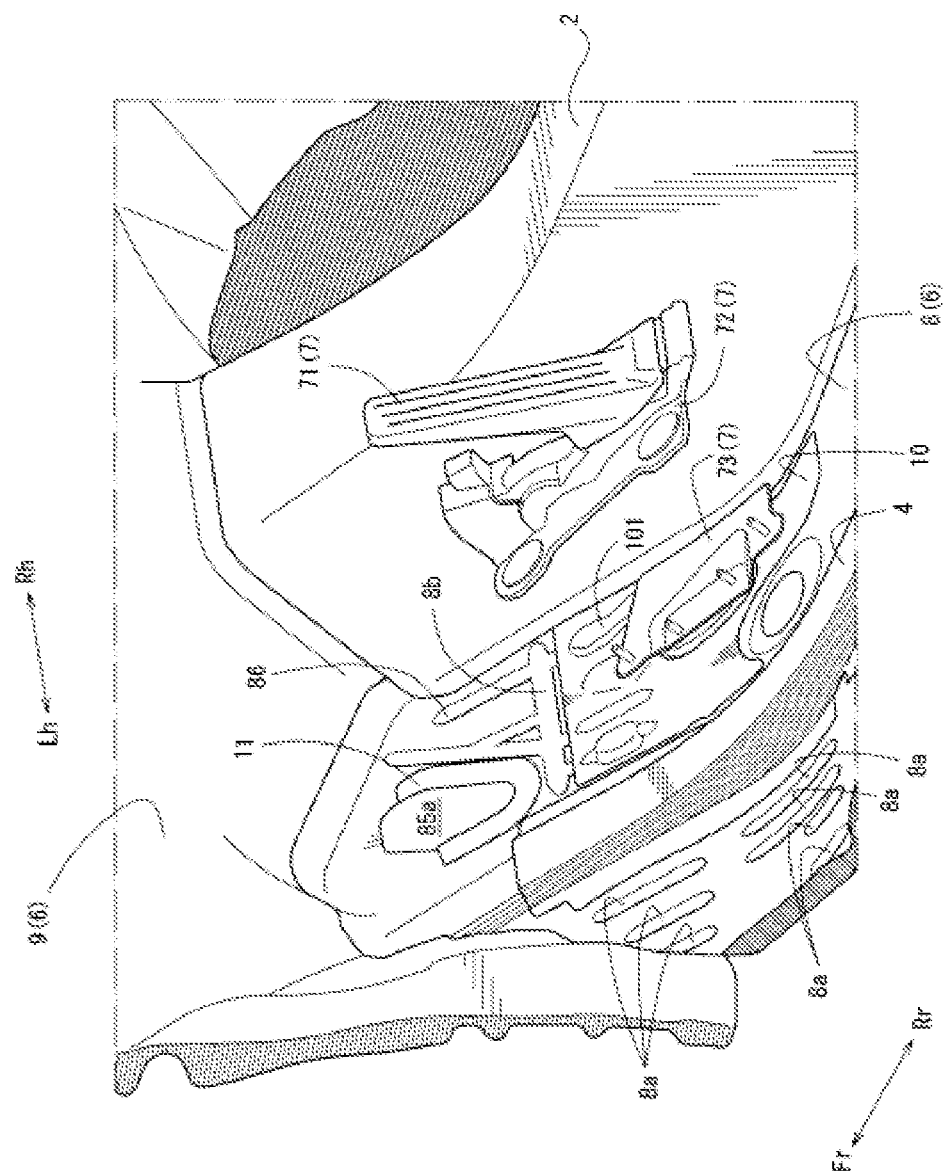
FIG. 3 is an external perspective view illustrating an external appearance of a panel rear portion in a state where an accelerator pedal is disassembled.

Note that FIG. 1 illustrates a plan view of a vehicle left side in a vehicle front portion, FIG. 2 illustrates an external perspective view of a dash panel 6 as seen from an inside of a vehicle cabin, and FIG. 3 illustrates an external perspective view of a panel rear portion 81 in a state where an accelerator pedal 7 is disassembled.

Figure 4:
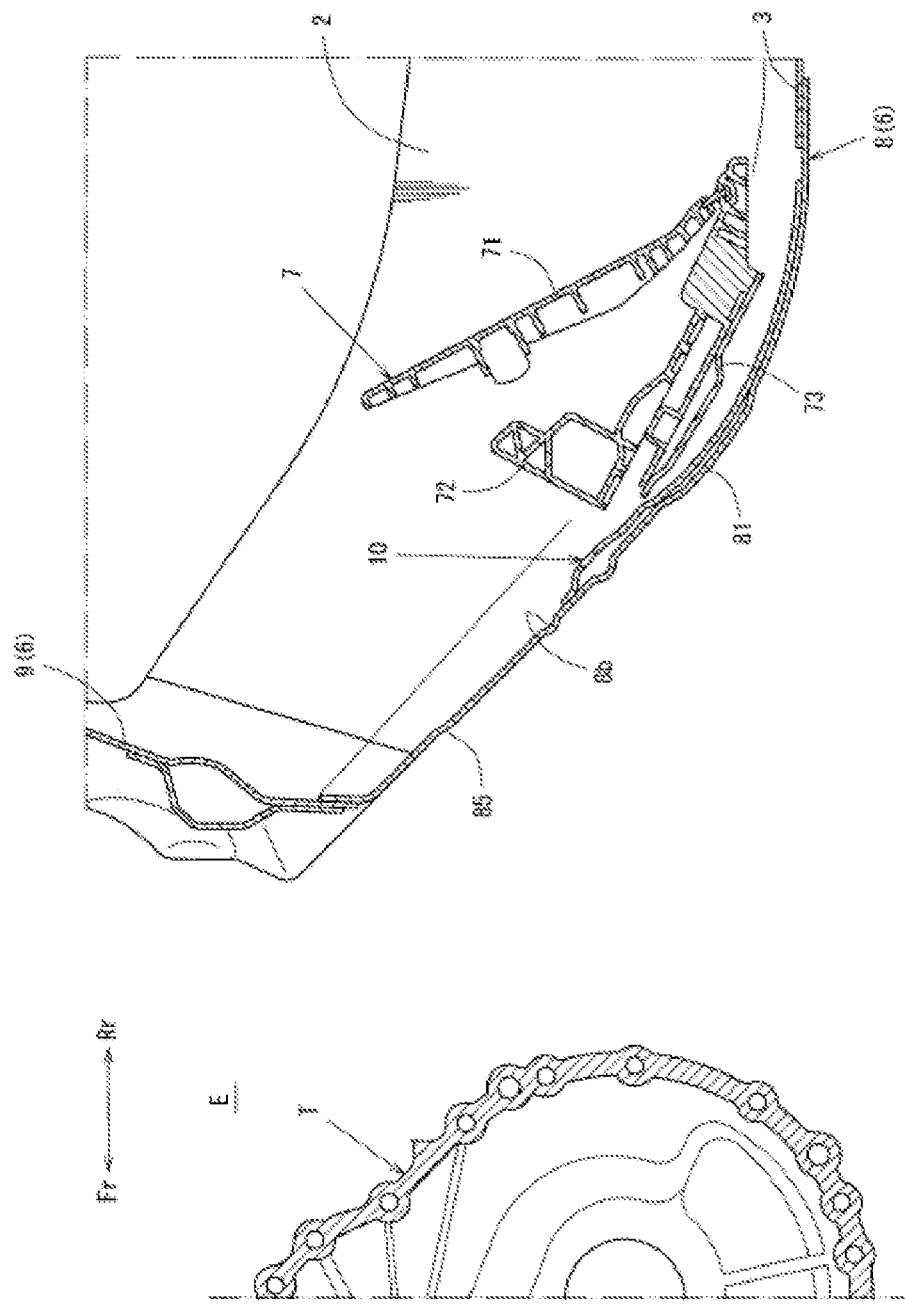
FIG. 4 is a cross-sectional view taken along A-A in FIG. 1.
Figure 5:
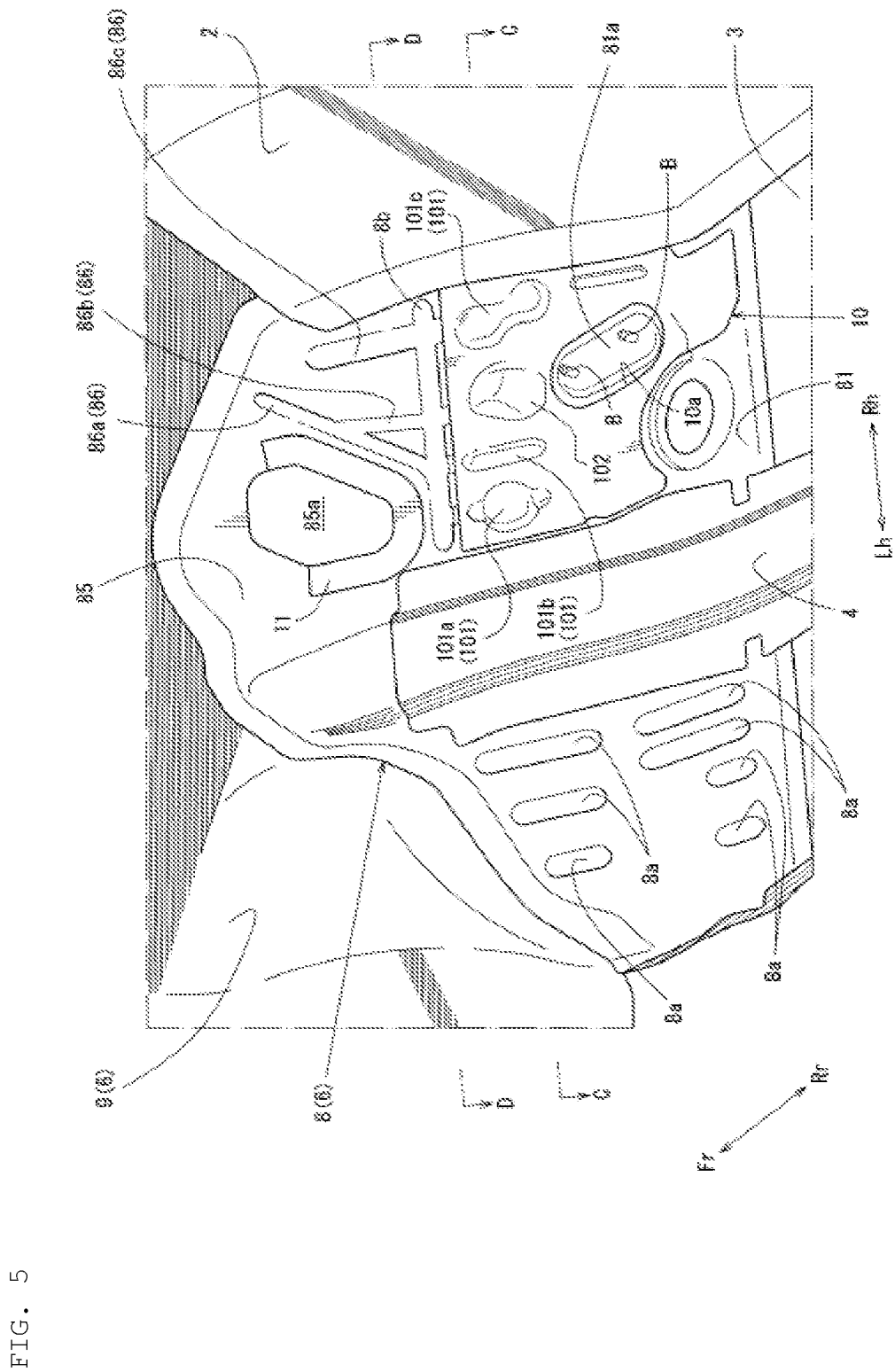
FIG. 5 is an external perspective view illustrating an external appearance of a dash lower panel.
Figure 6:
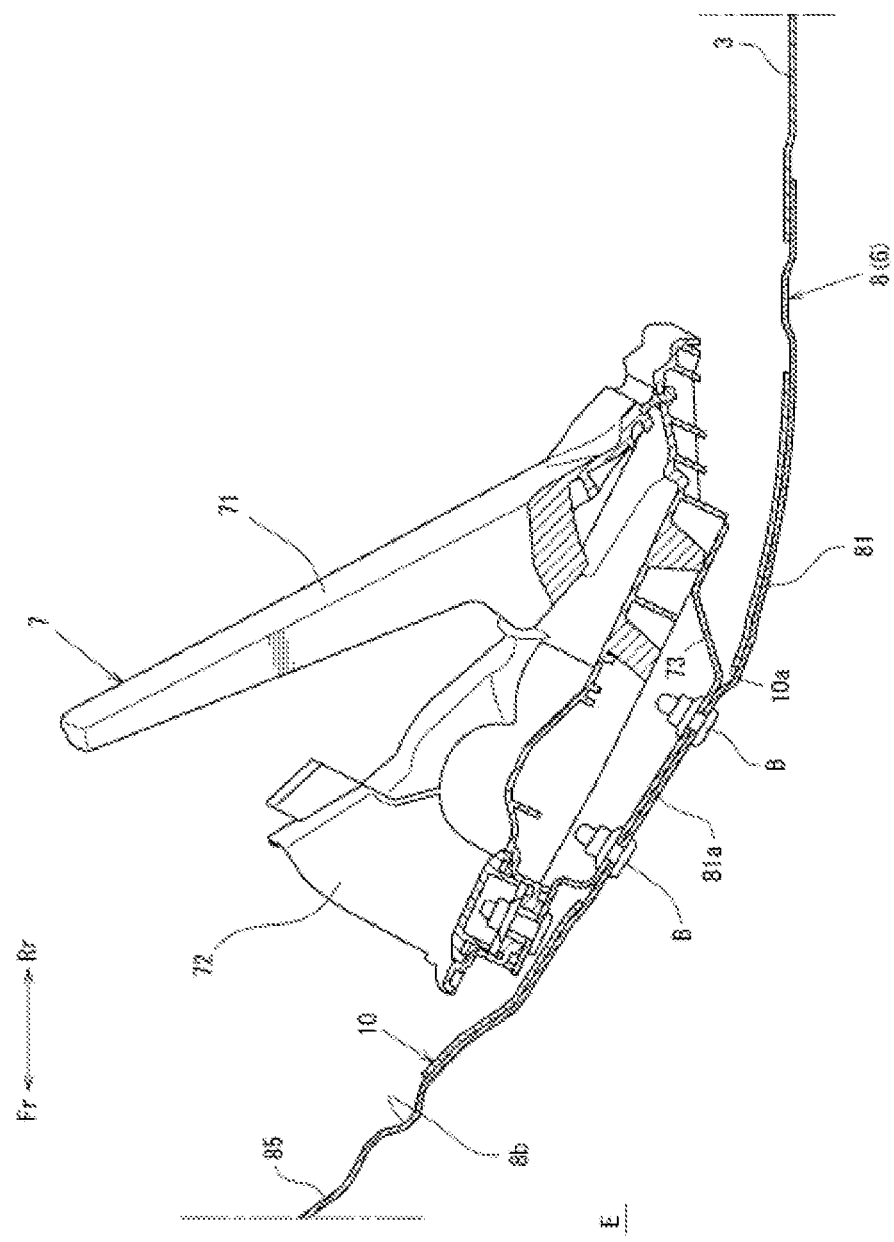
FIG. 6 is a cross-sectional view taken along B-B in FIG. 1.
Figure 7:
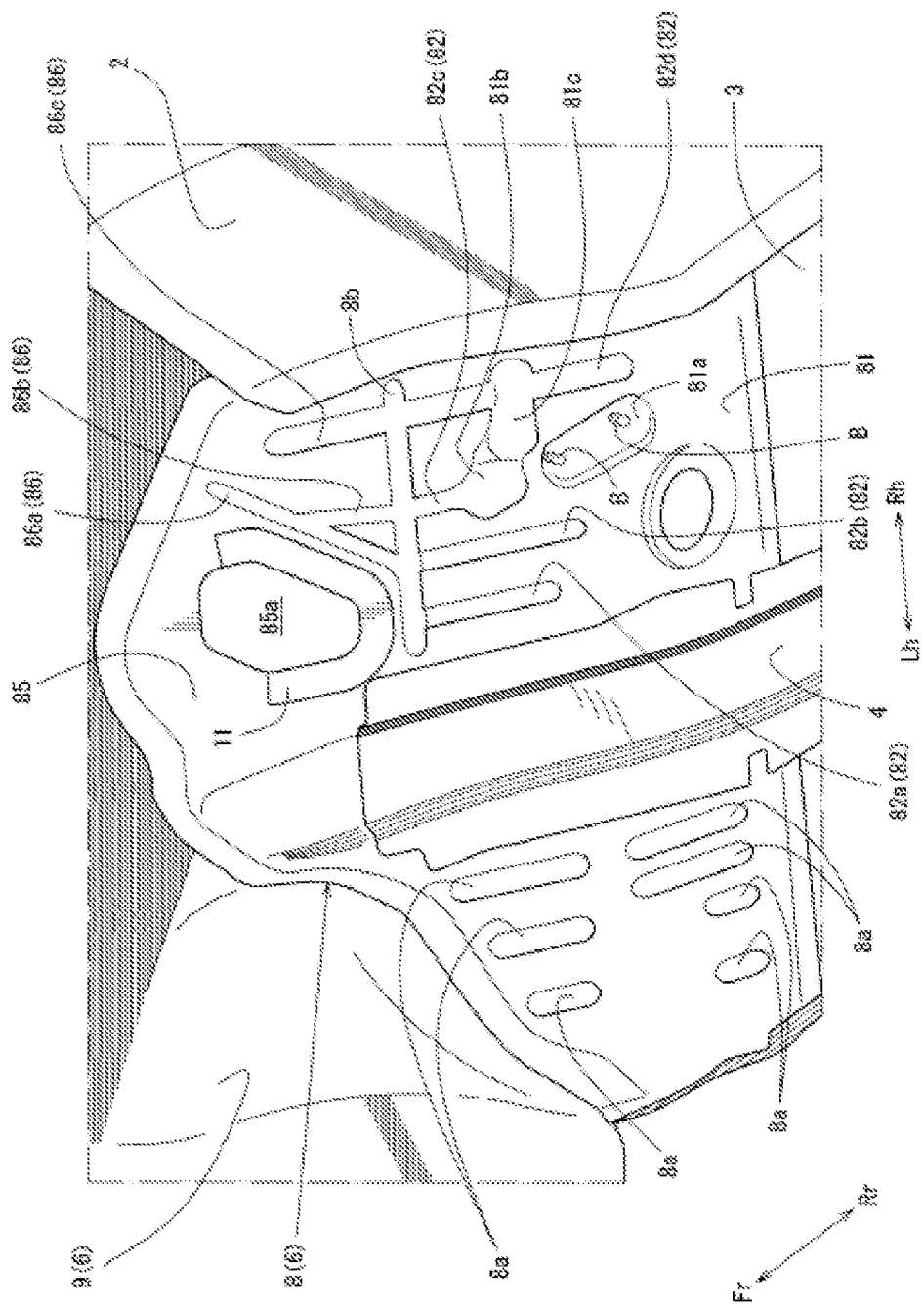
FIG. 7 is an external perspective view illustrating an external appearance of the dash lower panel in a state where a reinforcement member is detached.
Figure 8:
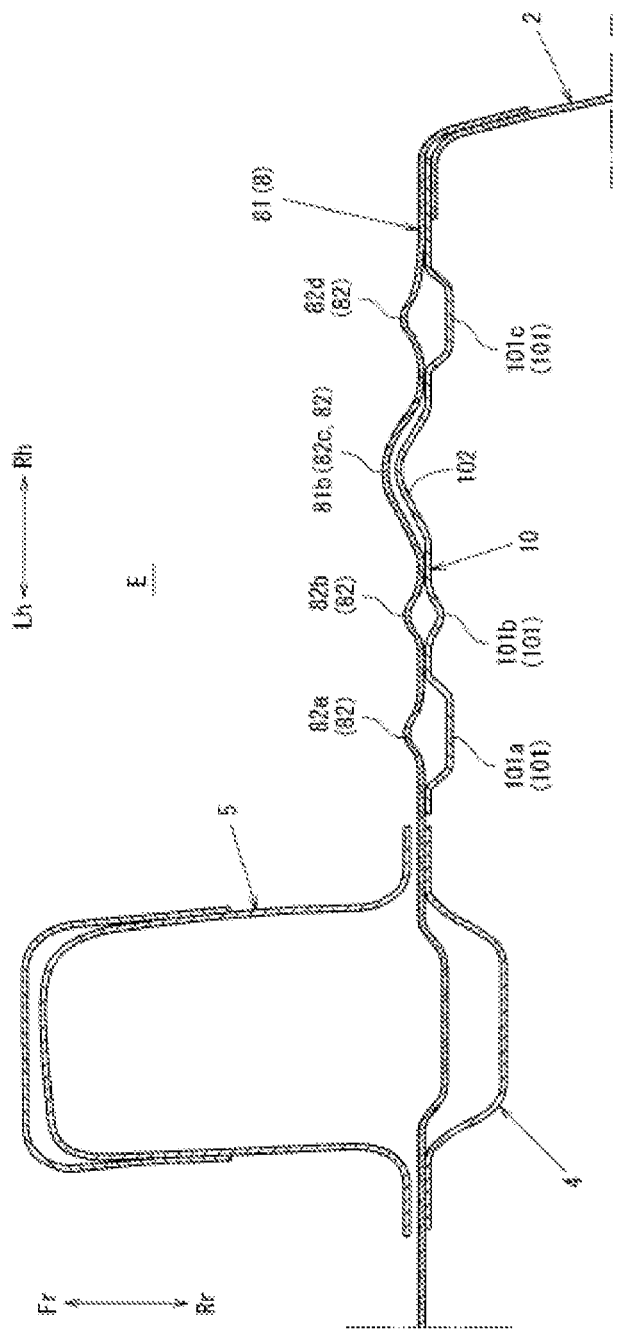
FIG. 8 is a cross-sectional view taken along C-C in FIG. 5.
Figure 9:
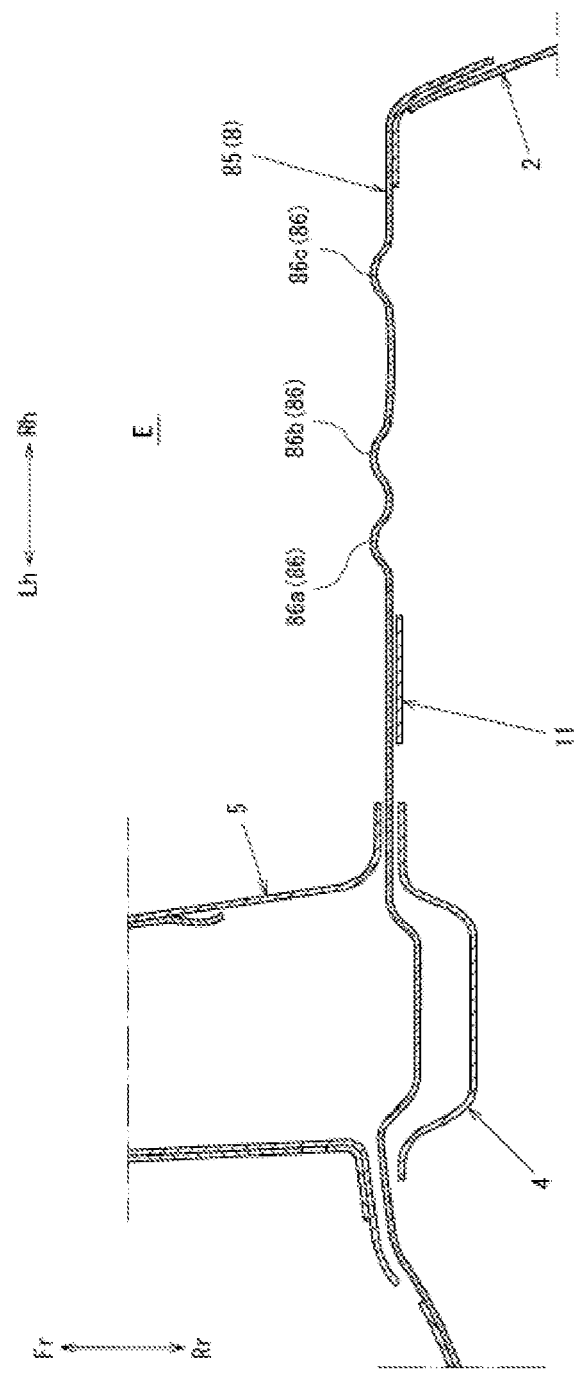
FIG. 9 is a cross-sectional view taken along D-D in FIG. 5.

Furthermore, FIG. 4 illustrates a cross-sectional view taken along A-A in FIG. 1, FIG. 5 illustrates an external perspective view of a dash lower panel 8, FIG. 6 illustrates a cross-sectional view taken along B-B in FIG. 1, and FIG. 7 illustrates an external perspective view of the dash lower panel 8 in a state where a reinforcement member 10 is detached. In addition, FIG. 8 illustrates a cross-sectional view taken along C-C in FIG. 5, and FIG. 9 illustrates a cross-sectional view taken along D-D in FIG. 5.

In the drawings, an arrow Fr and an arrow Rr indicate a front-rear direction, the arrow Fr indicates front, and the arrow Rr indicates rear. Furthermore, an arrow Rh and an arrow Lh indicate a vehicle width direction, the arrow Rh indicates a right direction, and the arrow Lh indicates a left direction. Note that in this embodiment, a description will be provided of a left side in the vehicle width direction in the vehicle front portion, and detailed descriptions and illustrations of a right side in the vehicle width direction will not be provided.

A vehicle 1 is a left-hand drive vehicle in which a driver seat is arranged on the left side in the vehicle width direction. As illustrated in FIG. 1, a vehicle front portion of this vehicle 1 includes a floor tunnel 2 extending in a vehicle front-rear direction at a general center in the vehicle width direction in a vehicle cabin and a floor panel 3 disposed on a vehicle-width-direction outer side of the floor tunnel 2 and forming a vehicle cabin floor.

Furthermore, as illustrated in FIG. 1, the vehicle front portion of the vehicle 1 includes a floor frame 4 as a vehicle-body framework member extending in the vehicle front-rear direction on the vehicle-width-direction outer side of the floor tunnel 2 and a front side frame 5 as a vehicle-body framework member extending from a front end of the floor frame 4 to a vehicle front.

In addition, as illustrated in FIG. 1, the vehicle front portion of the vehicle 1 includes the dash panel 6 dividing the inside from the outside of the vehicle cabin in the vehicle front-rear direction, the dash panel 6, a transmission T disposed in an engine room E surrounded by the front side frames 5, and the accelerator pedal 7 disposed in the dash panel 6.

More specifically, as illustrated in FIG. 1 and FIG. 2, the floor frame 4 is disposed across the floor panel 3 and the dash panel 6 in a position on the vehicle-width-direction outer side of a general center of the floor panel 3 in the vehicle width direction. This floor frame 4 is formed such that its cross-sectional shape in a vertical cross-section along the vehicle width direction forms a closed cross-section with the floor panel 3 and the dash panel 6.

The front side frame 5 is formed into a shape extending from the dash panel 6 to the vehicle front so as to be continuous with the floor frame 4. Note that a rear portion of the front side frame 5 is disposed so as to overlap with the floor frame 4 with the dash panel 6 interposed therebetween (see FIG. 8 and FIG. 9).

Specifically, the front side frame 5 is a closed cross-sectional member that has a closed cross-section of a cross-sectional shape in a vertical cross-section along the vehicle width direction, and is composed of an outer panel positioned on the vehicle-width-direction outer side and an inner panel positioned on the vehicle-width-direction inner side with respect to the outer panel.

As illustrated in FIG. 2 and FIG. 3, the dash panel 6 is composed of the dash lower panel 8 disposed in a vehicle lower side and a dash upper panel 9 disposed on a vehicle upper side of the dash lower panel 8.

As illustrated in FIG. 2 and FIG. 3, the dash lower panel 8 is a panel member that is disposed on a vehicle front side of the floor panel 3 and in a portion on the vehicle-width-direction outer side of the floor tunnel 2. As illustrated in FIG. 3 and FIG. 4, this dash lower panel 8 is formed so as to rise from a front end of the floor panel 3 to a vehicle front upper side.

Specifically, as illustrated in FIG. 4, the dash lower panel 8 is disposed in a state where it is inclined such that a front end is positioned on the vehicle upper side of a back end in a vertical cross-section along the vehicle front-rear direction. Note that the dash lower panel 8 is formed into a shape having a shorter length in the vehicle front-rear direction in a portion on the vehicle-width-direction outer side of the floor frame 4 than the length in the vehicle front-rear direction in a portion between the floor tunnel 2 and the floor frame 4.

As illustrated in FIG. 2 and FIG. 4, the dash upper panel 9 is a panel member that divides the inside from the outside of the vehicle cabin in the vehicle front-rear direction on the vehicle upper side of the floor tunnel 2 and the dash lower panel 8. As illustrated in FIG. 3 and FIG. 4, this dash panel 6 is formed into a shape extending from an upper end of the dash lower panel 8 toward a vehicle rear upper side.

Specifically, as illustrated in FIG. 4, the dash upper panel 9 is disposed in a state where it is inclined such that an upper end is positioned in vehicle rear of a lower end in a vertical cross-section along the vehicle front-rear direction.

The transmission T is an automatic transmission, for example, and as illustrated in FIG. 1 and FIG. 4, is disposed in a position being adjacent to the front side frame 5 on the vehicle-width-direction inner side and being spaced apart, to the vehicle front, at a predetermined interval from the dash lower panel 8 of the dash panel 6. In other words, the transmission T is disposed on the left side of the engine room E in the vehicle width direction.

As illustrated in FIG. 2 to FIG. 4, the accelerator pedal 7 is an organ type accelerator pedal. As illustrated in FIG. 1 to FIG. 3, this accelerator pedal 7 is fixed to an upper surface on the vehicle-width-direction inner side in the dash lower panel 8. Thus, the accelerator pedal 7 is adjacent to the floor tunnel 2 on the left side in the vehicle width direction and is opposed to the transmission T with the dash panel 6 interposed therebetween.

Specifically, as illustrated in FIG. 1 to FIG. 3, the accelerator pedal 7 is disposed on a vehicle rear side of a general center of the dash lower panel 8 in the vehicle front-rear direction. As illustrated in FIG. 3 and FIG. 4, this accelerator pedal 7 includes a pedal step surface portion 71 on which the right foot of an occupant is placed, a pedal pedestal 72 swingably supporting a lower end of the pedal step surface portion 71 via a hinge, and a base plate 73 fixing the pedal pedestal 72 to the dash panel 6.

Note that although detailed illustrations are not made, in the pedal pedestal 72, a detection sensor detecting a swing angle of the pedal step surface portion 71 as an accelerator opening, a connector with which a wire harness for communicating with an ECU controlling an engine is connected, and so forth are built.

A detailed description will next be made about the dash lower panel 8 of the above-described dash panel 6.

As illustrated in FIG. 5 and FIG. 6, the dash lower panel 8 includes plural longitudinal beads 8a generally linearly extending in the vehicle front-rear direction on the vehicle-width-direction outer side of the floor frame 4 and a generally linear lateral bead 8b being adjacent to a vehicle front side of the accelerator pedal 7 on the vehicle-width-direction inner side of the floor frame 4 and extending in the vehicle width direction.

This lateral bead 8b divides the dash lower panel 8 into a panel rear portion 81 on the vehicle rear side and a panel front portion 85 on the vehicle front side between the floor tunnel 2 and the floor frame 4. Furthermore, as illustrated in FIG. 5 and FIG. 6, the dash lower panel 8 includes a reinforcement member 10 reinforcing the panel rear portion 81 and an opening reinforcement member 11 reinforcing a periphery of an insertion hole 85a provided in the panel front portion 85.

More specifically, the longitudinal bead 8a is formed such that its cross-sectional shape in a horizontal cross-section along the vehicle width direction becomes a cross-sectional shape in a general arc shape protruding to a vehicle front lower side. As illustrated in FIG. 5, the plural longitudinal beads 8a are formed in a front portion and a rear portion on the vehicle-width-direction outer side of the floor frame 4 while being spaced apart at predetermined intervals in the vehicle width direction.

The lateral bead 8b is configured to function as a fragile portion in the dash lower panel 8 in cooperation with the panel rear portion 81 and the panel front portion 85. Specifically, as illustrated in FIG. 5, the lateral bead 8b is formed to have such a length that both ends in the vehicle width direction are respectively positioned close to the floor tunnel 2 and the floor frame 4. Furthermore, as illustrated in FIG. 6, the lateral bead 8b is formed such that its cross-sectional shape in a vertical cross-section along the vehicle front-rear direction becomes a cross-sectional shape in a general arc shape protruding to the vehicle front lower side.

As illustrated in FIG. 5 and FIG. 6, the panel rear portion 81 is a portion on the vehicle rear side of the lateral bead 8b. As illustrated in FIG. 3 to FIG. 7, in this panel rear portion 81, in the vicinity of a general center in the vehicle width direction, a seat surface portion 81a to which the base plate 73 of the accelerator pedal 7 is fixed is provided to protrude toward the vehicle upper side.

As illustrated in FIG. 7, this seat surface portion 81a is formed into a generally long elliptical shape that is long in a vehicle up-down direction. Furthermore, as illustrated in FIG. 5 to FIG. 7, the seat surface portion 81a includes two stud bolts B that are for fastening the base plate 73 of the accelerator pedal 7 and are spaced apart at a predetermined interval in the vehicle front-rear direction.

As illustrated in FIG. 7 and FIG. 8, in such a panel rear portion 81, four rear portion beads 82 extending in the vehicle front-rear direction are formed adjacently to the lateral bead 8b while being spaced apart at predetermined intervals in the vehicle width direction. Note that among the four rear portion beads 82, the rear portion bead 82 formed on the leftmost side in the vehicle width direction is set as a first rear portion bead 82a, and in order from the left side in the vehicle width direction, the rear portion beads 82 positioned on the vehicle-width-direction inner sides of the first rear portion bead 82a are set as a second rear portion bead 82b, a third rear portion bead 82c, and a fourth rear portion bead 82d.

Specifically, as illustrated in FIG. 7, the first rear portion bead 82a is formed with a length in the vehicle front-rear direction from the vicinity of a left end of the lateral bead 8b in the vehicle width direction to a position slightly in the vehicle front of the seat surface portion 81a and into a generally linear shape extending in the vehicle front-rear direction. As illustrated in FIG. 8, this first rear portion bead 82a is formed such that its cross-sectional shape in a horizontal cross-section along the vehicle width direction becomes a cross-sectional shape in a general arc shape protruding to the vehicle front lower side.

As illustrated in FIG. 7, the second rear portion bead 82b is formed in a position on the vehicle-width-direction outer side of the seat surface portion 81a, with a length in the vehicle front-rear direction from the lateral bead 8b to a front portion of the seat surface portion 81a, and into a generally linear shape extending in the vehicle front-rear direction. As illustrated in FIG. 8, this second rear portion bead 82b is formed such that its cross-sectional shape in a horizontal cross-section along the vehicle width direction becomes a cross-sectional shape in a general arc shape protruding to the vehicle front lower side.

As illustrated in FIG. 7, the third rear portion bead 82c is formed in generally the same position in the vehicle width direction as the seat surface portion 81a, with a length in the vehicle front-rear direction from the lateral bead 8b to the vicinity of a front end of the seat surface portion 81a, and into a generally linear shape extending in the vehicle front-rear direction.

As illustrated in FIG. 8, this third rear portion bead 82c is formed such that its cross-sectional shape in a horizontal cross-section along the vehicle width direction becomes a cross-sectional shape in a general arc shape protruding to the vehicle front lower side. Furthermore, as illustrated in FIG. 7, a bulge portion 81b bulging to the vehicle front lower side in a general dome shape is formed in a rear portion of the third rear portion bead 82c.

As illustrated in FIG. 7, the fourth rear portion bead 82d is formed with a length in the vehicle front-rear direction from the vicinity of a right side of the lateral bead 8b in the vehicle width direction to a back end of the seat surface portion 81a and into a generally linear shape extending in the vehicle front-rear direction. As illustrated in FIG. 8, this fourth rear portion bead 82d is formed such that its cross-sectional shape in a horizontal cross-section along the vehicle width direction becomes a cross-sectional shape in a general arc shape protruding to the vehicle front lower side.

Furthermore, as illustrated in FIG. 7, a recess portion 81c protruding to the vehicle front lower side with a back surface shape in a generally long elliptical shape that is long in the vehicle width direction is formed at a general center of the fourth rear portion bead 82d in the vehicle front-rear direction. Note that as illustrated in FIG. 7, a left end in the vehicle width direction in this recess portion 81c is coupled with the bulge portion 81b of the third rear portion bead 82c.

Further, as illustrated in FIG. 4 to FIG. 6, the panel front portion 85 is a portion provided to extend from a front end of the panel rear portion 81 toward the vehicle front upper side with the lateral bead 8b interposed therebetween. As illustrated in FIG. 3 and FIG. 7, in this panel front portion 85, the insertion hole 85a through which a steering shaft not illustrated is inserted is formed to open on the vehicle front side of the first rear portion bead 82a and the second rear portion bead 82b of the panel rear portion 81.

Note that as illustrated in FIG. 3 and FIG. 7, the insertion hole 85a is formed to open in a generally long elliptical shape that is long in the vehicle front-rear direction in a back view. Furthermore, as illustrated in FIG. 5 and FIG. 7, in the panel front portion 85, three front portion beads 86 being adjacent to the lateral bead 8b and extending in the vehicle front-rear direction are formed while being spaced apart at predetermined intervals in the vehicle width direction.

Note that among the three front portion beads 86, the front portion bead 86 formed on the leftmost side in the vehicle width direction is set as a first front portion bead 86a, and in order from the left side in the vehicle width direction, the front portion beads 86 positioned on the vehicle-width-direction inner sides of the first front portion bead 86a are set as a second front portion bead 86b and a third front portion bead 86c.

Specifically, as illustrated in FIG. 7, the first front portion bead 86a is formed in generally the same position in the vehicle width direction as the second rear portion bead 82b of the panel rear portion 81 and into a generally linear shape extending, along the insertion hole 85a, from the lateral bead 8b toward the vehicle front and the right side in the vehicle width direction.

Note that as illustrated in FIG. 7, the first front portion bead 86a is formed with a length in the vehicle front-rear direction from the lateral bead 8b to the vicinity of the front end of the dash lower panel 8. As illustrated in FIG. 9, this first front portion bead 86a is formed such that its cross-sectional shape in a horizontal cross-section along the vehicle width direction becomes a cross-sectional shape in a general arc shape protruding to the vehicle front lower side.

As illustrated in FIG. 7, the second front portion bead 86b is formed in generally the same position in the vehicle width direction as the third rear portion bead 82c of the panel rear portion 81 and into a generally linear shape extending from the lateral bead 8b toward the vehicle front.

Note that as illustrated in FIG. 7, a front end of the second front portion bead 86b is coupled with the first front portion bead 86a. As illustrated in FIG. 9, this second front portion bead 86b is formed such that its cross-sectional shape in a horizontal cross-section along the vehicle width direction becomes a cross-sectional shape in a general arc shape protruding to the vehicle front lower side.

As illustrated in FIG. 7, the third front portion bead 86c is formed in generally the same position in the vehicle width direction as the fourth rear portion bead 82d of the panel rear portion 81, with a length in the vehicle front-rear direction from the lateral bead 8b to the vicinity of the front end of the dash lower panel 8, and into a generally linear shape extending in the vehicle front-rear direction. As illustrated in FIG. 9, this third front portion bead 86c is formed such that its cross-sectional shape in a horizontal cross-section along the vehicle width direction becomes a cross-sectional shape in a general arc shape protruding to the vehicle front lower side.

Further, as illustrated in FIG. 5, the reinforcement member 10 is formed in a size covering an upper surface of the panel rear portion 81 and is joined to the upper surface of the panel rear portion 81. As illustrated in FIG. 5, an opening 10a through which the seat surface portion 81a is inserted is formed to open in this reinforcement member 10. Note that as illustrated in FIG. 5, the opening 10a is formed to open in a generally long elliptical shape that is long in the vehicle front-rear direction.

Furthermore, as illustrated in FIG. 5, the reinforcement member 10 includes three reinforcement beads 101 formed while being spaced apart at predetermined intervals in the vehicle width direction and one bulge 102. Note that among the three reinforcement beads 101, the reinforcement bead 101 formed on the leftmost side in the vehicle width direction is set as a first reinforcement bead 101a, and in order from the left side in the vehicle width direction, the reinforcement beads 101 positioned on the vehicle-width-direction inner sides of the first reinforcement bead 101a are set as a second reinforcement bead 101b and a third reinforcement bead 101c.

Specifically, as illustrated in FIG. 5, FIG. 7, and FIG. 8, the first reinforcement bead 101a is formed in generally the same position in the vehicle width direction as the first rear portion bead 82a and with a shorter length in the vehicle front-rear direction than the first rear portion bead 82a. As illustrated in FIG. 8, this first reinforcement bead 101a is formed to have a cross-section in a general arc shape protruding toward the vehicle rear upper side in a horizontal cross-section along the vehicle width direction.

Furthermore, as illustrated in FIG. 5 and FIG. 8, the first reinforcement bead 101a is formed into a shape in which its generally central portion in the vehicle front-rear direction bulges toward the vehicle rear upper side in a general truncated cone shape. Moreover, as illustrated in FIG. 8, the first reinforcement bead 101a configures a closed cross-section with the first rear portion bead 82a of the panel rear portion 81 in a state where the panel rear portion 81 and the reinforcement member 10 are joined together.

As illustrated in FIG. 5, FIG. 7, and FIG. 8, the second reinforcement bead 101b is formed in generally the same position in the vehicle width direction as the second rear portion bead 82b and with a shorter length in the vehicle front-rear direction than the second rear portion bead 82b. As illustrated in FIG. 8, this second reinforcement bead 101b is formed to have a cross-section in a general arc shape protruding toward the vehicle rear upper side in a horizontal cross-section along the vehicle width direction.

Moreover, as illustrated in FIG. 8, the second reinforcement bead 101b configures a closed cross-section with the second rear portion bead 82b of the panel rear portion 81 in a state where the panel rear portion 81 and the reinforcement member 10 are joined together.

As illustrated in FIG. 5, FIG. 7, and FIG. 8, the third reinforcement bead 101c is formed in generally the same position in the vehicle width direction as the fourth rear portion bead 82d and with a shorter length in the vehicle front-rear direction than the fourth rear portion bead 82d.

As illustrated in FIG. 8, this third reinforcement bead 101c is formed to have a cross-section in a generally trapezoidal shape protruding toward the vehicle rear upper side in a horizontal cross-section along the vehicle width direction. Moreover, as illustrated in FIG. 8, the third reinforcement bead 101c configures a closed cross-section with the fourth rear portion bead 82*d* of the panel rear portion 81 in a state where the panel rear portion 81 and the reinforcement member 10 are joined together.

As illustrated in FIG. 5, FIG. 7, and FIG. 8, the bulge 102 is formed in generally the same position in the vehicle width direction as the bulge portion 81*b* of the panel rear portion 81. As illustrated in FIG. 8, this bulge 102 is formed to have a cross-sectional shape protruding toward the vehicle front lower side in a horizontal cross-section along the vehicle width direction. That is, the bulge 102 is formed so as to overlap with the bulge portion 81*b* of the panel rear portion 81 in a state where the panel rear portion 81 and the reinforcement member 10 are joined together.

Further, as illustrated in FIG. 5, an opening reinforcement member 11 is a reinforcement member joined to an upper surface of the panel front portion 85. As illustrated in FIG. 5, this opening reinforcement member 11 is in a general U-shape along a lower portion of an opening edge of the insertion hole 85*a* in a back view and reinforces the lower portion of the opening edge of the insertion hole 85*a* along a portion between the insertion hole 85*a* and the lateral bead 8*b* and a portion between the insertion hole 85*a* and the first front portion bead 86*a*.

Figure 10:
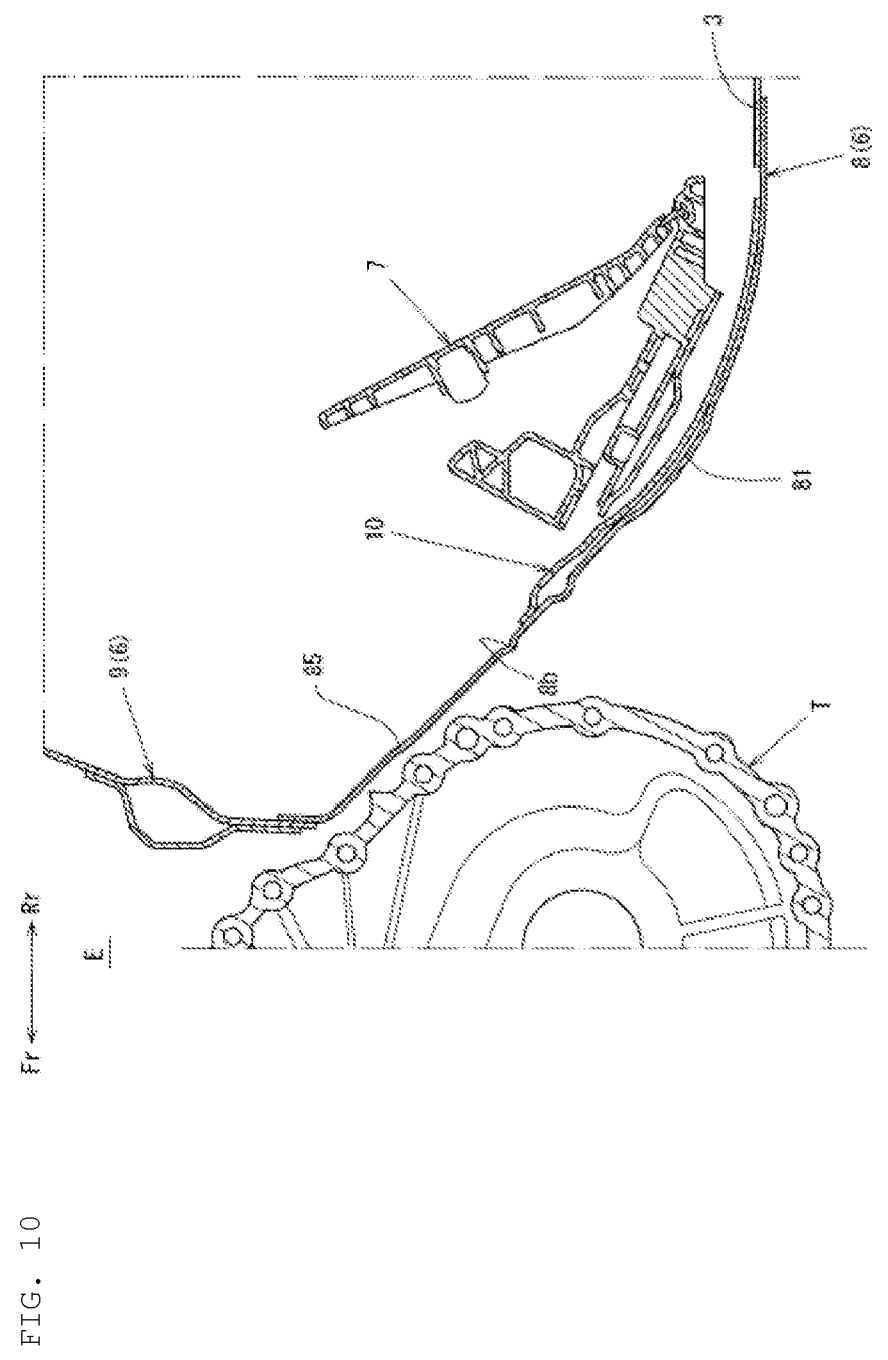

Next, a brief description will be made with reference to FIG. 10 and FIG. 11 about a state in the front vehicle-body structure for the vehicle 1 in the above-described configuration in a case where the transmission T moving backward to the vehicle rear due to collision with a collision object that contacts with the dash panel 6. Note that FIG. 10 illustrates a cross-sectional view of a state where the transmission T contacts with the dash lower panel 8, and FIG. 11 illustrates a cross-sectional view of a state where the dash lower panel 8 is deformed.

First, in a case where a collision object collides with the vehicle front portion between the front side frames 5, the transmission T is pressed by the collision object and thereby starts moving toward the vehicle rear in the engine room E. In this case, because the dash panel 6 is positioned in the vehicle rear of the transmission T, as illustrated in FIG. 10, the transmission T first contacts with a front end of the dash panel 6, that is, the panel front portion 85 in the dash lower panel 8.

When the transmission T thereafter further moves to the vehicle rear, the transmission T presses the panel front portion 85 of the dash lower panel 8 to the vehicle rear. In this case, because the rigidity of the lateral bead 8*b* is relatively low with respect to the panel rear portion 81 and the panel front portion 85, the lateral bead 8*b* functions as the fragile portion in the dash lower panel 8.

Figure 11:
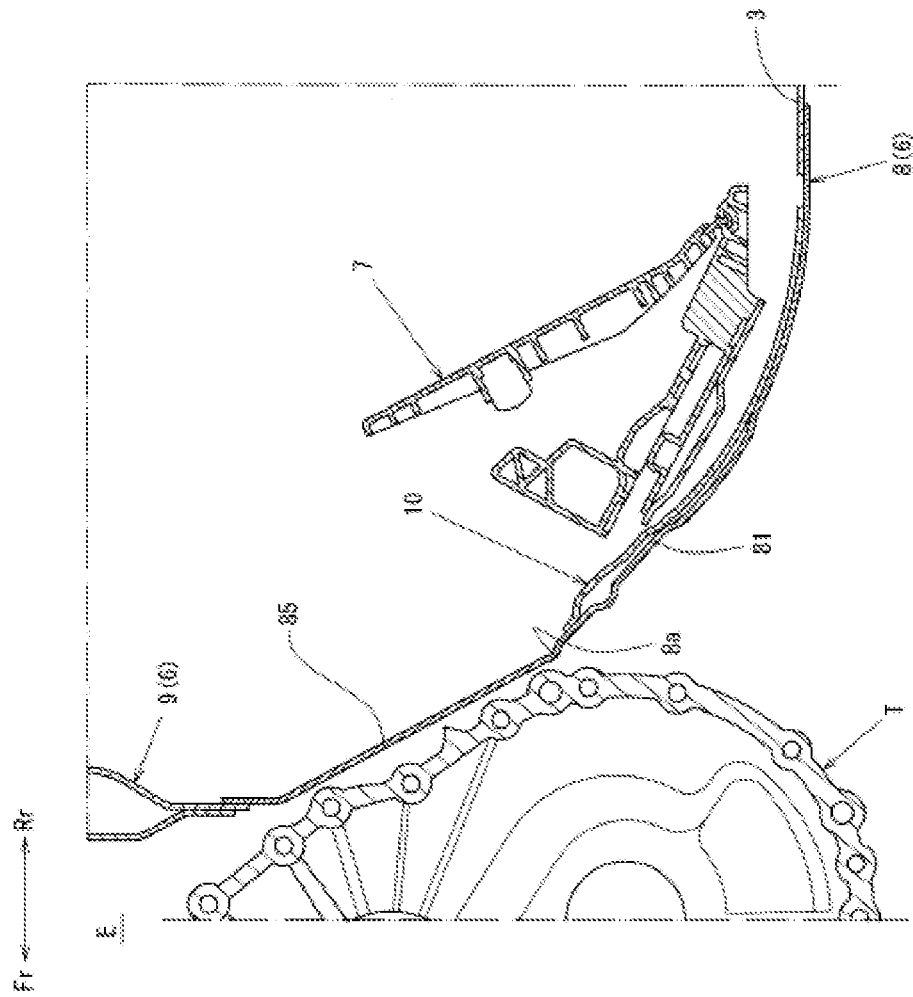
FIG. 11 is a cross-sectional view, along arrows A-A, illustrating a state where the dash lower panel is deformed.

Thus, when the panel front portion 85 is pressed by the transmission T, as illustrated in FIG. 11, the dash lower panel 8 bends and deforms at the lateral bead 8*b* such that a front end of the panel front portion 85 rotationally moves toward the vehicle rear upper side around the lateral bead 8*b* as a pivot.

In such a manner, when the dash lower panel 8 is pressed to the vehicle rear by the transmission T, the front vehicle-body structure for the vehicle 1 inhibits the accelerator pedal 7 from being displaced to the vehicle rear integrally with the panel rear portion 81.

As described above, the front vehicle-body structure for the vehicle 1 includes the transmission T disposed in the vehicle front portion, the dash lower panel 8 dividing the inside from the outside of the vehicle cabin in the vehicle rear of the transmission T, and the organ type accelerator pedal 7 disposed on the vehicle-width-direction inner side of the dash lower panel 8 opposed to the transmission T.

Furthermore, the dash lower panel 8 includes the panel rear portion 81 in which the accelerator pedal 7 is arranged and the panel front portion 85 extending from the panel rear portion 81 to the vehicle front upper side.

In addition, the dash lower panel 8 includes the fragile portion (lateral bead 8*b*) extending in the vehicle width direction along a boundary between the panel rear portion 81 and the panel front portion 85 and being fragile compared to the panel rear portion 81 and the panel front portion 85. In this disclosure, the front vehicle-body structure for the vehicle 1 can inhibit a weight increase and reduce an impact load transmitted to the lower limbs of the occupant.

Specifically, because the panel front portion 85 of the dash lower panel 8 is provided to extend from the panel rear portion 81 to the vehicle front upper side, the front vehicle-body structure for the vehicle 1 can cause the transmission T moving backward due to collision with the collision object to contact with the panel front portion 85 earlier than the panel rear portion 81.

In this case, because the fragile portion (lateral bead 8*b*) is provided in the boundary between the panel rear portion 81 and the panel front portion 85, the front vehicle-body structure for the vehicle 1 can bend the dash lower panel 8 at the fragile portion (lateral bead 8*b*) such that the panel front portion 85 rotationally moves to the vehicle rear around the fragile portion (lateral bead 8*b*) as the pivot.

Accordingly, the front vehicle-body structure for the vehicle 1 can absorb an impact load applied to the dash lower panel 8 and inhibit the accelerator pedal 7 from being displaced to the vehicle rear. Thus, the front vehicle-body structure for the vehicle 1 can inhibit the impact load from acting on the lower limbs of the occupant as a force causing the toes to approach the shins.

Furthermore, because it is sufficient that only the fragile portion (lateral bead 8*b*) is provided in the dash lower panel 8, the front vehicle-body structure for the vehicle 1 can inhibit a weight increase compared to a case where a board thickness of the dash lower panel 8 is made thick. Consequently, the front vehicle-body structure for the vehicle 1 can inhibit a weight increase and reduce the impact load transmitted to the lower limbs of the occupant.

Further, the fragile portion is composed of the lateral bead 8*b* protruding to a vehicle lower side and extending in the vehicle width direction. With this configuration, in the front vehicle-body structure for the vehicle 1, the fragile portion can be formed with a comparatively simple configuration. Thus, the front vehicle-body structure for the vehicle 1 can certainly inhibit a weight increase.

Further, the panel front portion 85 of the dash lower panel 8 includes the front portion beads 86 being adjacent to the lateral bead 8*b* and extending in the vehicle front-rear direction. With this configuration, because the rigidity of the panel front portion 85 can be improved in the front vehicle-body structure for the vehicle 1, a rigidity difference between the fragile portion (lateral bead 8*b*) and the panel front portion 85 can be made large.

Thus, when the impact load is applied to the dash lower panel 8 via the transmission T, the front vehicle-body structure for the vehicle 1 can certainly bend the dash lower panel 8 at the fragile portion (lateral bead 8*b*). Consequently, the front vehicle-body structure for the vehicle 1 can certainly reduce the impact load transmitted to the lower limbs of the occupant by the front portion beads 86 provided in the panel front portion 85.

Further, the panel rear portion 81 of the dash lower panel 8 includes the rear portion beads 82 being adjacent to the lateral bead 8*b* and extending in the vehicle front-rear direction. With this configuration, because the rigidity of the panel rear portion 81 can be improved in the front vehicle-body structure for the vehicle 1, a rigidity difference between the fragile portion (lateral bead 8b) and the panel rear portion 81 can be made large.

Thus, when the impact load is applied to the dash lower panel 8 via the transmission T, the front vehicle-body structure for the vehicle 1 can more certainly bend the dash lower panel 8 at the fragile portion (lateral bead 8b). Furthermore, because the rigidity of the panel rear portion 81 is improved by the rear portion beads 82, the front vehicle-body structure for the vehicle 1 can inhibit the panel rear portion 81 from being deformed due to an impact load applied to the dash panel 6.

Thus, the front vehicle-body structure for the vehicle 1 can inhibit the accelerator pedal 7 from being displaced to the vehicle rear together with the panel rear portion 81. Consequently, the front vehicle-body structure for the vehicle 1 can more certainly reduce the impact load transmitted to the lower limbs of the occupant by the rear portion beads 82 provided in the panel rear portion 81.

Further, the dash lower panel 8 includes the reinforcement member 10 having a front end positioned close to the fragile portion (lateral bead 8b) and covering the panel rear portion 81. With this configuration, because the rigidity of the panel rear portion 81 can be improved more in the front vehicle-body structure for the vehicle 1, the rigidity difference between the fragile portion (lateral bead 8b) and the panel rear portion 81 can further be made large.

Thus, when the impact load is applied to the dash lower panel 8 via the transmission T, the front vehicle-body structure for the vehicle 1 can further certainly bend the dash lower panel 8 at the fragile portion (lateral bead 8b). Furthermore, because the rigidity of the panel rear portion 81 is improved by the reinforcement member 10, the front vehicle-body structure for the vehicle 1 can further inhibit the panel rear portion 81 from being deformed due to the impact load applied to the dash panel 6.

Thus, the front vehicle-body structure for the vehicle 1 can further inhibit the accelerator pedal 7 from being displaced to the vehicle rear together with the panel rear portion 81. Consequently, since the reinforcement member 10 is provided that covers the panel rear portion 81, the front vehicle-body structure for the vehicle 1 can further certainly reduce the impact load transmitted to the lower limbs of the occupant.

Further, the reinforcement member 10 includes reinforcement beads 101 protruding to the vehicle upper side and forming closed cross-sections with the panel rear portion 81. With this configuration, because the rigidity of the panel rear portion 81 can further be improved in the front vehicle-body structure for the vehicle 1, the rigidity difference between the fragile portion (lateral bead 8b) and the panel rear portion 81 can still further be made large.

Thus, when the impact load is applied to the dash lower panel 8 via the transmission T, the front vehicle-body structure for the vehicle 1 can more certainly bend the dash lower panel 8 at the fragile portion (lateral bead 8b). Furthermore, because the rigidity of the panel rear portion 81 is improved by the reinforcement beads 101 of the reinforcement member 10, the front vehicle-body structure for the vehicle 1 can certainly inhibit the panel rear portion 81 from being deformed due to the impact load applied to the dash panel 6.

Thus, the front vehicle-body structure for the vehicle 1 can certainly inhibit the accelerator pedal 7 from being displaced to the vehicle rear together with the panel rear portion 81. Consequently, since the reinforcement beads 101 are provided in the reinforcement member 10, the front vehicle-body structure for the vehicle 1 can still further reduce the impact load transmitted to the lower limbs of the occupant.

Further, the panel front portion 85 of the dash lower panel 8 includes the insertion hole 85a through which the steering shaft is inserted and the opening reinforcement member 11 disposed along the opening edge of the insertion hole 85a. With this configuration, in the front vehicle-body structure for the vehicle 1, the opening reinforcement member 11 is provided, the periphery of the insertion hole 85a can thereby be inhibited from being fragile, and the rigidity of the panel front portion 85 can be inhibited from being lowered due to the insertion hole 85a.

Thus, even in a case where the insertion hole 85a is provided, the front vehicle-body structure for the vehicle 1 can secure the rigidity difference between the fragile portion (lateral bead 8b) and the panel front portion 85. Accordingly, when the impact load is applied to the dash lower panel 8 via the transmission T, the front vehicle-body structure for the vehicle 1 can certainly bend the dash lower panel 8 at the fragile portion (lateral bead 8b). Consequently, even in a case where the insertion hole 85a is provided in the panel front portion 85, the front vehicle-body structure for the vehicle 1 can reduce the impact load transmitted to the lower limbs of the occupant.

In correspondence between a configuration of this disclosure and the above-described embodiment, a power train of this disclosure corresponds to the transmission T of the embodiment, a dash panel corresponds to the dash lower panel 8, a fragile portion corresponds to the lateral bead 8b, and a vehicle component corresponds to the steering shaft; however, this disclosure is not limited only to the configuration of the above-described embodiment but may provide many embodiments.

For example, in the above-described embodiment, the dash panel 6 is composed of the dash lower panel 8 and the dash upper panel 9; however, a dash panel is not limited to this but may be a dash panel in which a dash lower panel and a dash upper panel are integrally formed.

Further, the fragile portion is in a configuration including the lateral bead 8b in the dash lower panel 8; however, a configuration is not limited to this but may be in an appropriate shape as long as it extends in the vehicle width direction and functions as the fragile portion. For example, a thin portion in which a boundary portion between a panel front portion and a panel rear portion is made thin may be included in the dash lower panel as the fragile portion.

Further, the front portion beads 86 of the panel front portion 85 and the rear portion beads 82 of the panel rear portion 81 are provided that are in shapes protruding to the vehicle front lower side; however, a front portion bead and a rear portion bead are not limited to those but may be a front portion bead and a rear portion bead in shapes protruding to the vehicle rear upper side.

Further, the reinforcement member 10 is joined to the upper surface of the panel rear portion 81 in the dash lower panel 8; however, a reinforcement member is not limited to this but may be provided to a lower surface of the panel rear portion 81. Further, the panel front portion 85 is provided that includes the insertion hole 85a through which the steering shaft is inserted; however, an insertion hole is not limited to this but may be an insertion hole through which an appropriate vehicle component such as a wire harness is inserted, for example.

Further, although a description has been made about the front vehicle-body structure for the left-hand drive vehicle that includes the transmission T disposed in the vehicle front portion and the organ type accelerator pedal 7 disposed on the vehicle-width-direction inner side of the dash lower panel 8 opposed to the transmission T, the description is not exclusive.

For example, a configuration is possible that includes a lateral bead functioning as a fragile portion on a vehicle front side of a foot rest in a front vehicle-body structure for a right-hand drive vehicle including an engine disposed in a vehicle front portion and the foot rest arranged on a vehicle-width-direction inner side of a dash lower panel opposed to the engine. In this case also, similar effects to the above-described embodiment can be provided.

What is claimed is:

1. A front vehicle-body structure for a vehicle, the front vehicle-body structure comprising:
    a power train disposed in a vehicle front portion;
    a dash panel dividing an inside from an outside of a vehicle cabin in vehicle rear of the power train; and
    an organ type accelerator pedal or a foot rest disposed on a vehicle-width-direction inner side of the dash panel opposed to the power train, wherein
    the dash panel includes:
    a panel rear portion in which the accelerator pedal or the foot rest is arranged;
    a panel front portion extending from the panel rear portion to a vehicle front upper side; and
    a fragile portion extending in a vehicle width direction along a boundary between the panel rear portion and the panel front portion and being fragile compared to the panel rear portion and the panel front portion.

2. The front vehicle-body structure for a vehicle according to claim 1, wherein
    the fragile portion is composed of
    a lateral bead protruding to a vehicle lower side and extending in the vehicle width direction.

3. The front vehicle-body structure for a vehicle according to claim 2, wherein
    the panel front portion of the dash panel includes
    a front portion bead adjacent to the lateral bead and extending in a vehicle front-rear direction.

4. The front vehicle-body structure for a vehicle according to claim 3, wherein
    the panel rear portion of the dash panel includes
    a rear portion bead adjacent to the lateral bead and extending in a vehicle front-rear direction.

5. The front vehicle-body structure for a vehicle according to claim 4, wherein
    the dash panel includes
    a reinforcement member having a front end positioned close to the fragile portion and covering the panel rear portion.

6. The front vehicle-body structure for a vehicle according to claim 5, wherein
    the reinforcement member includes
    a reinforcement bead protruding to a vehicle upper side and forming a closed cross-section with the panel rear portion.

7. The front vehicle-body structure for a vehicle according to claim 6, wherein
    the panel front portion of the dash panel includes:
    an insertion hole through which a vehicle component is inserted; and
    an opening reinforcement member disposed along an opening edge of the insertion hole.

8. The front vehicle-body structure for a vehicle according to claim 1, wherein
    the dash panel includes
    a reinforcement member having a front end positioned close to the fragile portion and covering the panel rear portion.

9. The front vehicle-body structure for a vehicle according to claim 1, wherein
    the panel front portion of the dash panel includes:
    an insertion hole through which a vehicle component is inserted; and
    an opening reinforcement member disposed along an opening edge of the insertion hole.

10. The front vehicle-body structure for a vehicle according to claim 2, wherein
    the panel rear portion of the dash panel includes
    a rear portion bead adjacent to the lateral bead and extending in a vehicle front-rear direction.

11. The front vehicle-body structure for a vehicle according to claim 2, wherein
    the dash panel includes
    a reinforcement member having a front end positioned close to the fragile portion and covering the panel rear portion.

12. The front vehicle-body structure for a vehicle according to claim 2, wherein
    the panel front portion of the dash panel includes:
    an insertion hole through which a vehicle component is inserted; and
    an opening reinforcement member disposed along an opening edge of the insertion hole.

13. The front vehicle-body structure for a vehicle according to claim 3, wherein
    the dash panel includes
    reinforcement member having a front end positioned close to the fragile portion and covering the panel rear portion.

14. The front vehicle-body structure for a vehicle according to claim 3, wherein
    the panel front portion of the dash panel includes:
    an insertion hole through which a vehicle component is inserted; and
    an opening reinforcement member disposed along an opening edge of the insertion hole.

15. The front vehicle-body structure for a vehicle according to claim 4, wherein
    the panel front portion of the dash panel includes:
    an insertion hole through which a vehicle component is inserted; and
    an opening reinforcement member disposed along an opening edge of the insertion hole.

16. The front vehicle-body structure for a vehicle according to claim 5, wherein
    the panel front portion of the dash panel includes:
    an insertion hole through which a vehicle component is inserted; and
    an opening reinforcement member disposed along an opening edge of the insertion hole.

17. The front vehicle-body structure for a vehicle according to claim 8, wherein
    the reinforcement member includes
    a reinforcement bead protruding to a vehicle upper side and forming a closed cross-section with the panel rear portion.

18. The front vehicle-body structure for a vehicle according to claim 11, wherein
    the reinforcement member includes a reinforcement bead protruding to a vehicle upper side and forming a closed cross-section with the panel rear portion.

19. The front vehicle-body structure for a vehicle according to claim 2, further comprising a floor frame extending in the vehicle front-rear direction;
   wherein the lateral bead linearly extends in the vehicle width direction and is adjacent to a vehicle front side of the accelerator pedal on the vehicle-width-direction inner side of the floor frame.

20. The front vehicle-body structure for a vehicle according to claim 19, wherein the lateral bead has a cross-sectional shape in a vertical cross-section along the vehicle front-rear direction which includes an arc shape portion protruding to the vehicle front lower side.

* * * * *